United States Patent Office 3,539,335
Patented Nov. 10, 1970

3,539,335
PROCESS FOR THE REDUCTION
OF METAL HALIDES
Kjell Å. Svanström, Nynashamn, Sweden, assignor to Rederiaktiebolaget Nordstjernan, Nynashamn, Sweden, a joint-stock company of Sweden
No Drawing. Filed Feb. 15, 1968, Ser. No. 705,613
Claims priority, application Sweden, Feb. 23, 1967, 2,490/67
Int. Cl. B22f 9/00; C22b 49/00, 57/00
U.S. Cl. 75—.5         5 Claims

ABSTRACT OF THE DISCLOSURE

The invention relates to the reduction of halides or refractory metals by means of hydrogen gas in order to produce metal powders. Hitherto metal powders produced in that way have been very finely grained. This drawback has been met and a coarser grain size has been achieved by carrying out the reduction in two steps. The first step is only a partial reduction and takes place at a low reduction temperature, usually within the range 450–1000° C. The second step is a final reduction and takes place at a higher reduction temperature, usually within the range 800–1300° C.

---

This invention relates to a process for the reduction of metal halides by means of hydrogen gas in a gaseous state.

Metal powder of refractory metals, such as W, Mo, Ta and Nb may be produced by reduction with hydrogen in a gaseous state of the halides of the respective metals. Such a process implies several advantages in the processing of different raw materials. By the conversion of the metal components of the starting material to the halide, usually chlorides or fluorides, possibilities are created, e.g. by distillation or fractionated condensation, for achieving separation in a simple way without being forced to apply complicated chemical or physical processes. By fractionated distillation it is further possible to obtain products which are purer than those which may be obtained by other technical processes.

A limitation of the process lies in the circumstance that the powder which is produced in the reduction of halides in a gaseous state is very finely grained and more finely grained than the powder mostly used for practical purposes. This means that the types of powder produced according to the process have a very limited use.

The purpose of the present invention is to remedy this drawback and this is achieved so that the reduction is carried out in two steps.

If the reduction is carried out in such a way that in a first step, it is not followed up to completion and that the final reduction takes place in a second step which may be directly connected to the first one an effect may be exercised on the grain size.

The partial reduction in the first step may be achieved by lowering the temperature in the reaction zone and in this way reduce the reduction speed. The halide containing powder obtained in these conditions is then finally reduced in a second step by means of hydrogen gas at higher temperatures to a halide-free metal powder.

Although it has not been fully established it is assumed that the halides remaining after the first reduction step contribute to a grain-coarsening in the course of the final reduction. Owing to the low reduction temperature, usually 450–1000° C., in the first step a low reduction speed is obtained, a circumstance which improves the possibilities of exercising a careful checking of the rate of reduction and the final grain size. The powder partially reduced in the first step should retain a halide content of between 1.0 to 40 percent.

The reduction speed may be increased in the second step in order to reduce the length of treatment and ensure complete reduction. The final reduction shall normally be carried out at 800–1300° C. preferably at 900–1300° C.

In order to clarify the invention some illustrative examples of its practical application follow below.

EXAMPLE 1

1260 g. $WCl_6$ in a gaseous state was introduced into a reaction chamber which was maintained at a temperature of 700° C. at a speed of 23 g./min. Hydrogen gas was introduced into the chamber in an amount corresponding to an excess of 40 percent as compared with the amount required for complete reduction.

A tungsten power was obtained which had a residue chlorine content of 3.2 percent and a filling weight of 0.23 g./cm.$^3$. The powder was post-treated for one hour in hydrogen gas at 1000° C. The finally reduced powder had a specific surface of 4 m.$^2$/g. corresponding to an average diameter of 0.08 μm.

EXAMPLE 2

6370 g. $WCl_6$ in a gaseous state was introduced into a reaction chamber at a speed of 30 g./min. as in Example 1, at a temperature of 570° C. The excess of hydrogen gas was 110 percent. The tungsten powder obtained and a chlorine content of 11.5 percent and a filling weight of 0.24 g./cm.$^3$. A post-reduction in a hydrogen gas atmosphere for one hour at 1000° C. produced a powder with a specific surface of 2.7 m.$^2$/g., corresponding to an average diameter of 0.11 μm.

EXAMPLE 3

1390 g. $WCl_6$ was reduced at 500° C. with an excess of hydrogen gas of 140 percent to a powder with a chlorine content of 37.2 percent and a filling weight of 1.4 g./cm.$^3$. A post-reduction for one hour at 1000° C. produced a powder with a specific surface of 1 m.$^2$/g., i.e. an average diameter of 0.31 μm.

EXAMPLE 4

5460 g. $WOCl_4$ was reduced to a powder with a chlorine content of 9 percent at 750° C. with an excess of hydrogen gas of 50 percent. The feed speed of the chloride was 150 g./min. The powder obtained had a grain size of 0.04 μm. The post-reduction for one hour at 1050° C. resulted in a powder with a specific surface of 0.91 m.$^2$/g., i.e. an average diameter of 0.34 μm. If the post-reduction was made instead at 1200° C. for one hour the values of the powder were 0.54 m.$^2$/g. and 0.57 μm. respectively.

EXAMPLE 5

The importance of the post-treatment temperature for the grain growth is illustrated by the following tests. A pre-reduced tungsten powder with a chlorine content slightly below 1 percent was post-treated in a hydrogen gas for one hour at different temperatures with the following results:

| Temperature, ° C. | Specific surface, m.$^2$/g. | Grain size, μm. |
|---|---|---|
| 500 | 2.3 | 0.13 |
| 800 | 2.0 | 0.15 |
| 900 | 1.9 | 0.17 |
| 1,000 | 1.36 | 0.23 |
| 1,100 | 0.92 | 0.34 |
| 1,200 | 0.61 | 0.51 |

EXAMPLE 6

The coreduction of two metal chlorides was conducted in the following way in order to produce an alloyed powder: 8.2 kg. tungsten hexachloride was introduced into a boiler which was connected to the reduction chamber by means of a heated metal pipe.

The evaporation of the tungsten hexachloride was carried out at a speed of 200 g./min. and the chloride vapours were conducted via the heated pipe to a nozzle in the reduction chamber into which hydrogen gas was introduced in order to carry out the reduction.

The temperature in the chamber was 800° C. Via a branch pipe on the heated pipe molybdenum pentachloride was introduced parallel with the evaporation of the tungsten hexachloride so that the two chlorides were sufficiently well mixed prior to their introduction into the reduction chamber. The flow of molybdenum pentachloride was adapted in a way as to yield a metal alloy containing 3 percent molybdenum.

3.8 kg. metal powder was obtained with a chlorine content of 1.3 percent and a bulk density of 0.5 g./cm.$^3$. The powder was subsequently post-reduced in hydrogen gas at 1100° C. The grain size was 5.7 $\mu$m. (Fischer) and the molybdenum content 3.1 percent.

The microsond examination showed that the alloy was very homogeneous and that all grains of the powder had identical molybdenum content.

EXAMPLE 7

A test identical to the one described in Example 6 was carried out, except that the molybdenum pentachloride was replaced by rhenium pentachloride. 6.4 kg. tungsten hexachloride was evaporated at a speed of 150 g./min. The temperature of the reduction chamber was 800° C. 3 kg. tungsten powder was obtained with a rhenium content of 2.9 percent and a bulk density of 0.4 g./cm.$^3$.

The powder was post-reduced in hydrogen gas at 1000° C., the resulting grain size being 3.2 $\mu$m. (Fischer). Even in this case a very homogeneous alloy was obtained.

What we claim is:

1. A two-step process for the production of metal powder by the reduction of a gaseous metal halide with hydrogen wherein grain growth of the powder is effected during the second step which comprises, partially reducing the gaseous metal halide in a first step with hydrogen at a temperature of about 450° C. to 1000° C. whereby to produce a partially reduced metal powder having a retained halide content ranging from about 1% to 40% by weight, and then further reducing the partially reduced powder in a second step with hydrogen at a higher temperature than that employed in the first step but ranging from about 800° C. to 1300° C., whereby grain growth of the powder is effected.

2. The process of claim 1, wherein the halide of the metal is a refractory metal selected from the group consisting of W, Mo, Ta and Nb.

3. The process of claim 1 wherein the metal halide is a metal chloride.

4. A two-step process for the production of tungsten powder by the reduction of gaseous tungsten chloride with hydrogen wherein grain growth of the tungsten powder is effected during the second step which comprises, partially reducing the gaseous tungsten chloride in a first step with hydrogen at a temperature of about 440° C. to 1000° C. whereby to produce a partially reduced tungsten powder having a retained chloride content ranging from about 1% to 40% by weight, and then further reducing the partially reduced tungsten powder in a second step with hydrogen at a higher temperature than that employed in the first step but ranging from about 800° C. to 1000° C., whereby grain growth of the tungsten powder is effected.

5. The process of claim 4, wherein the reduction of the tungsten chloride in the first step is carried out at a slower rate than the rate employed in the second step.

References Cited

UNITED STATES PATENTS

| | | | |
|---|---|---|---|
| 3,062,638 | 11/1962 | Culbertson et al. | 75—0.5 |
| 3,177,067 | 4/1965 | Nichols | 75—0.5 |
| 3,341,320 | 9/1967 | Smiley | 75—0.5 |

L. DEWAYNE RUTLEDGE, Primary Examiner

W. W. STALLARD, Assistant Examiner

U.S. Cl. X.R.

75—84.4, 84.5

UNITED STATES PATENT OFFICE
CERTIFICATE OF CORRECTION

Patent No. 3,539,335                                              November 10, 1?

Kjell Å. Svanström

It is certified that error appears in the above identified patent and that said Letters Patent are hereby corrected as shown below:

Column 4, line 19, "440° C." should read -- 450° C. --.

Signed and sealed this 30th day of March 1971.

(SEAL)
Attest:

EDWARD M. FLETCHER, JR.                        WILLIAM E. SCHUYLER,
Attesting Officer                                     Commissioner of Pater